Aug. 31, 1937.  F. O. BLAKE  2,091,844
CHAIN PIN EXTRACTOR
Filed March 14, 1936  3 Sheets-Sheet 1
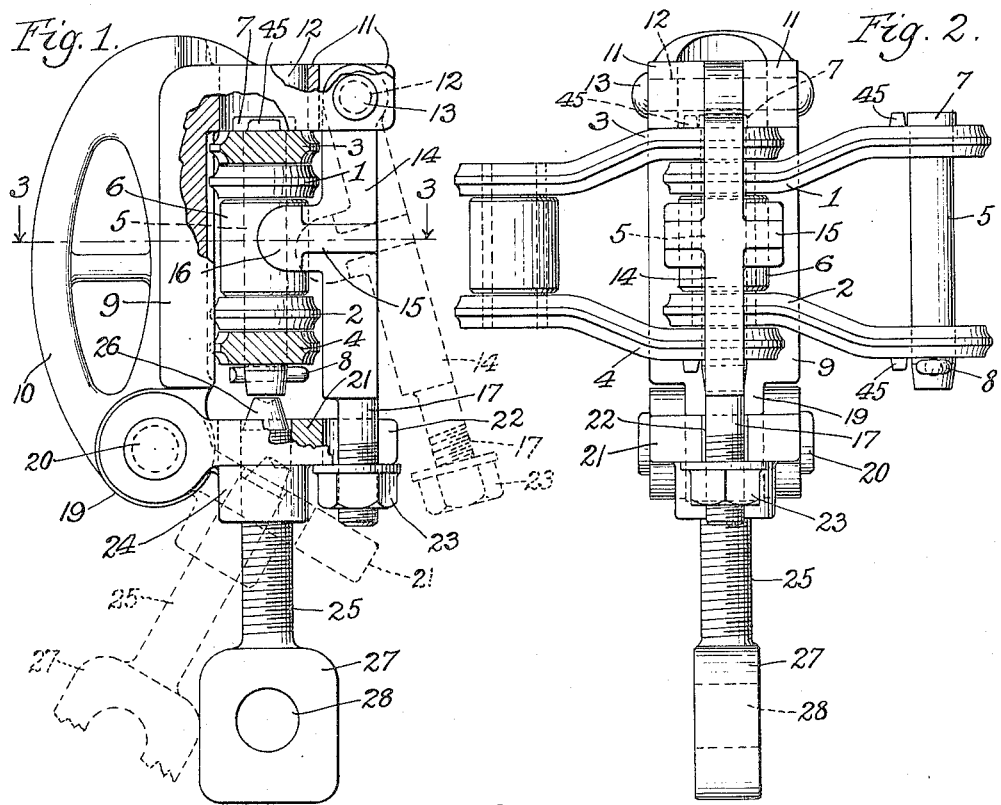
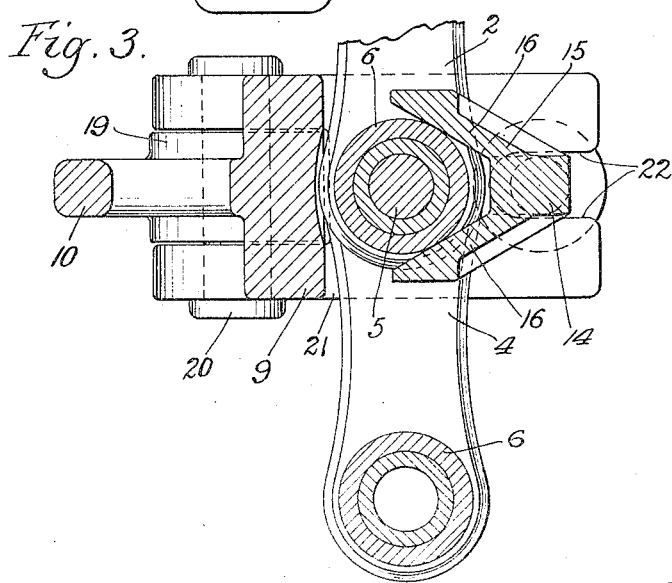
Inventor
Frank O. Blake Aug. 31, 1937.  F. O. BLAKE  2,091,844
CHAIN PIN EXTRACTOR
Filed March 14, 1936  3 Sheets-Sheet 2
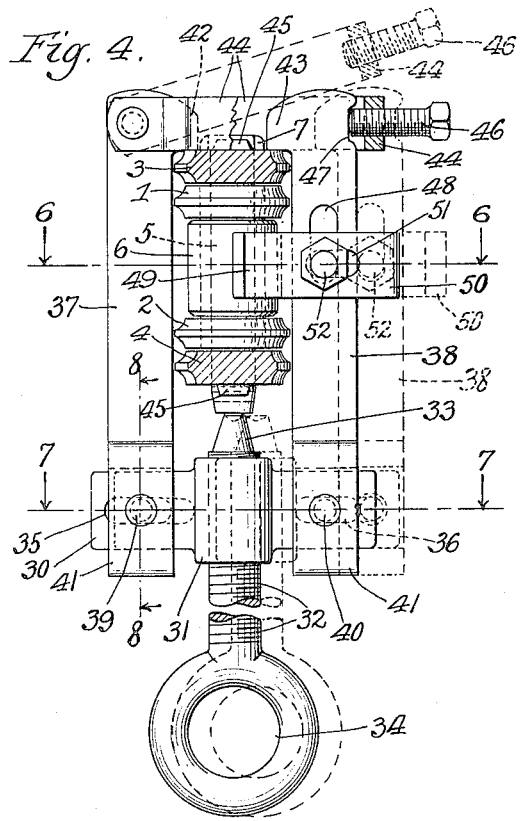
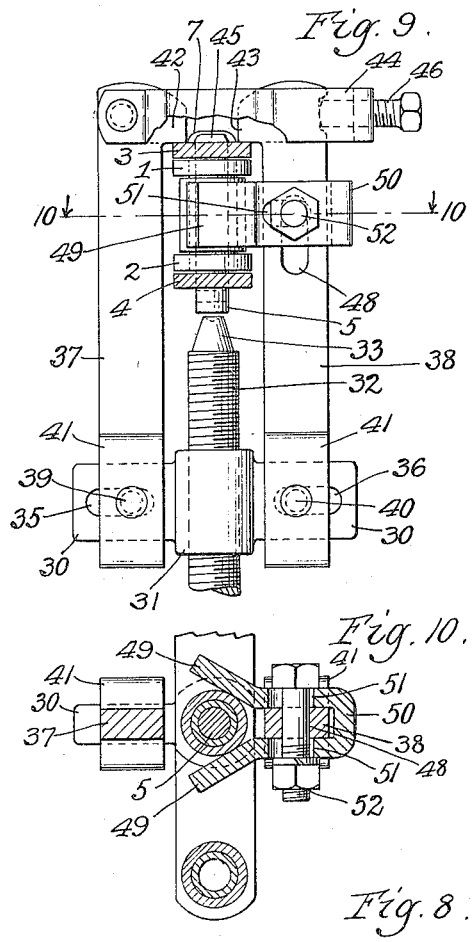
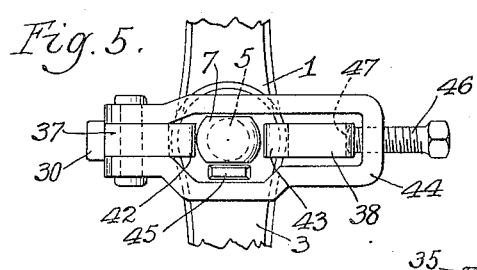
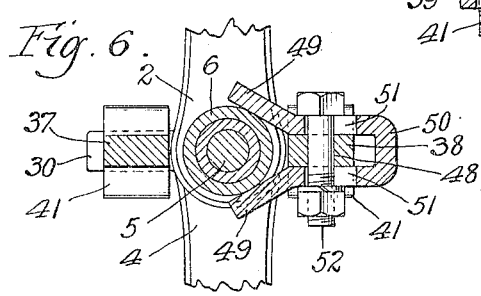
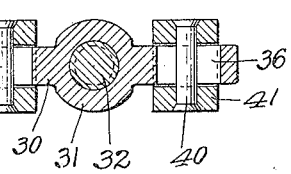
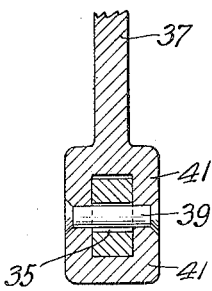
Inventor
Frank O. Blake
by Parker & Carter
Attorneys.

Aug. 31, 1937.  F. O. BLAKE  2,091,844
CHAIN PIN EXTRACTOR
Filed March 14, 1936  3 Sheets-Sheet 3
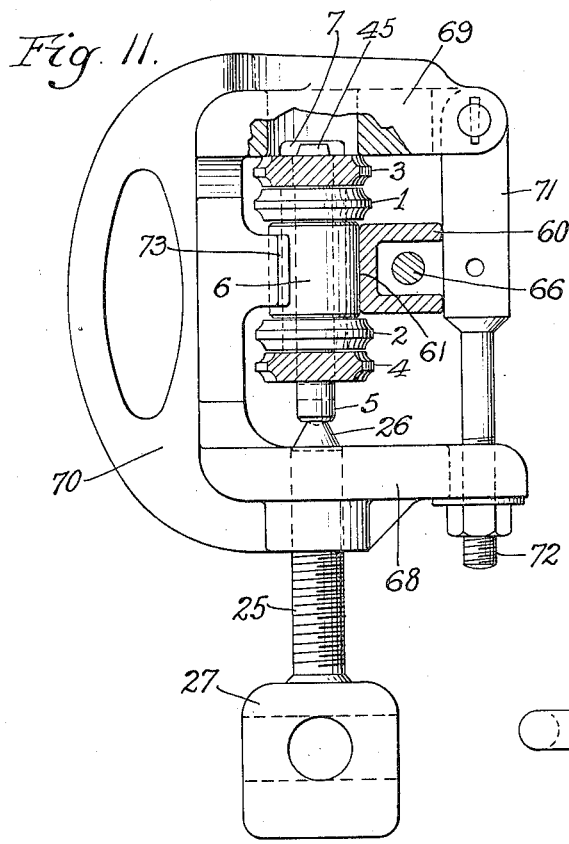
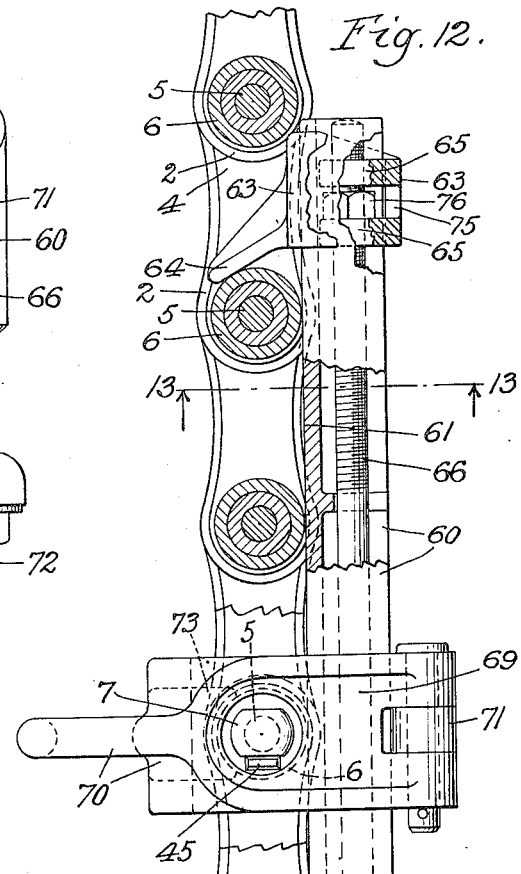
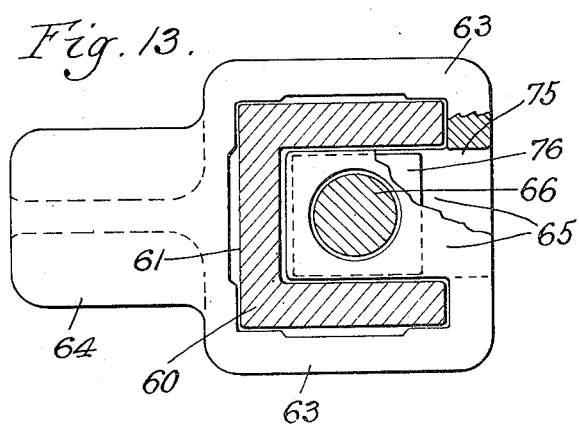
Inventor
Frank O. Blake
by
Attorneys Patented Aug. 31, 1937

2,091,844

UNITED STATES PATENT OFFICE 2,091,844

CHAIN PIN EXTRACTOR

Frank O. Blake, West Los Angeles, Calif., assignor to Link-Belt Company, Chicago, Ill., a corporation of Illinois Application March 14, 1936, Serial No. 68,822

8 Claims. (Cl. 29—86.1)

My invention relates to pintle pin extracting and setting devices for chains and the like and has for one object to provide a new and improved portable tool which may be used to repair and assemble transmission chain in the field. The invention is especially applicable for use in connection with assembled steel chains used in oil well drive rigging and the like. The chain habitually comprises a series of pairs of links sometimes separate and sometimes joined together. Between each pair of links is ordinarily a bushing, a roller and a single pintle pin passing through them which joins the two links of one pair with the two links of the other pair. These pintle pins must fit very tightly in the links and so are seated in the chain under very heavy pressure. When it is desired to disassemble the chain, or take out one or more pintle pins in the field, that has heretofore been done by use of a sledge or heavy hammer and this process is cumbersome and difficult and may result in damage to some of the machinery. This is especially true if the chain works in a housing.

My invention comprises a jaw member which may be placed about the chain at the pintle pin and may be clamped or locked in place with a screw or other power multiplying apparatus which can apply power to the pintle pin to force it out of the chain and to force a new pintle pin in.

Other objects of my invention will appear from time to time throughout the specification and claims.

My invention is illustrated more or less diagrammatically in the accompanying drawings, wherein—

Figure 1 is a side elevation of the preferred form of device showing a chain section;

Figure 2 is a view of the device of Figure 1 seen from the right;

Figure 3 is a section along the line 3—3 of Figure 1;

Figure 4 is a side elevation with parts in section of a modified form;

Figure 5 is a top plan view;

Figure 6 is a section along the line 6—6 of Figure 4;

Figure 7 is a section along the line 7—7 of Figure 4;

Figure 8 is a section along the line 8—8 of Figure 4;

Figure 9 is a view similar to Figure 4 showing the device adapted for a smaller chain;

Figure 10 is a section along the line 10—10 of Figure 9;

Figure 11 is a view generally similar to Figure 1 shown in modified form;

Figure 12 is a longitudinal section through a chain to which the modified form of extractor shown in Figure 11 has been applied; this figure includes parts in section, parts broken away, and parts in elevation;

Figure 13 is a transverse section taken on an enlarged scale along the line 13—13 of Figure 12.

Like parts are indicated by like characters throughout the specification and drawings.

The drive chain comprises pairs of links 1, 2; 3, 4. They are apertured to engage a pintle pin 5. Between the inner links 1, 2, is a bushing 611, and preferably a roller 6. The pintle pin 5, has at one end a head 7, at the other end a cotter 8. The chain is made up of a series of such links, pins and rollers. The roller is, of course, free to rotate on the bushing. The inner links 1 and 2 are also free to rotate on the bushing and the outer links 3, 4 are held against rotation with respect to the pin, being fitted with a very tight drive fit so that there is no tendency for the pin to rotate with respect to the outer links.

9 is a clamp body adapted to extend in parallelism with the pintle axis. For convenience in manipulation, it has a handle 10 on the side opposed to the chain. The clamp body has an integral bifurcated fixed arm 11, extending at right angles therefrom, apertured at 12 and supporting a pintle pin 13, on which is pivoted the tie rod 14. The tie rod 14 has an inwardly extending lug 15, forked at 16 to provide jaws to engage and center the roller 61 or if the roller is omitted to engage the bushing 6. The lower end of the tie rod 14 terminates in a threaded cylindrical shank 17.

At the lower end of the jaw or clamp body 9 and handle 10 is an apertured lug 19. 20 is a hinge pin in the lug, and on it is hinged a clamping arm 21, apertured at 22, so that the shank 17 may pass through it. 23 is a nut on the shank 17 adapted to hold the entire assembly together. 24 is a reinforcing boss and 25 is an extractor screw threaded therein. The screw has a truncated conical driving end 26 adapted to engage an end of the chain pintle pin 5 and an expanded head 27 apertured at 28 so that a tool may be inserted to rotate the screw. The hinged clamping arm 21 and its relationship with the shank 17 makes it possible to start the loosening of a pintle pin by hammering on the head 27 either before or as the screw is rotated.

It will be noted that the preferred form of device shown in Figures 1 to 3, is such as can be used only with a comparatively narrow limit of chain sizes. In the modified form shown in Figures 4 to 10, a device is shown which can be used to treat a very wide range of chain sizes. Figures 4 to 6 show the device applied to the same chain as applied to Figures 1 to 3; the chain is identical. The device comprises a cross head 30, having a central nut 31, in which is threaded a screw 32, having a tapered pintle engaging head 33, and at the other end a ring 34 to engage a tool. The cross head has a pair of slots 35, 36. 37, 38 are tension links, each having pins 39, 40 engaging the slots 35, and 36, the links having box ends 41 so that the function of the pins is only to hold them in loosely assembled position with respect to the cross head, the tension being taken on the box. The links 37, 38 at their free ends terminate in hooks 42, 43 adapted to rest upon the chain link and to contain between their ends the head of the chain pintle pin. 44 is a yoke pivoted on the end of the link 37 providing sufficient clearance to encircle the pintle pin and the lug 45 on the chain link. This yoke has a screw 46 engaging a notch 47, on the link 38, to hold the parts in proper working relationship. The link 38 is longitudinally slotted at 48, and carries the chain roller engaging jaw member 49, which member has a shank portion 50, slotted at 51. The bolt and nut 52 passing through the two slots 48 and 51 hold the jaw in loose relationship so that it may be adjusted both longitudinally and transversely to engage chain rollers of different sizes as indicated in connection with the small size chain shown in Figure 9.

In using the device of Figures 1 to 3, the shank 17 and the clamping arm 21 are swung out of engagement with one another even further apart than shown in dotted lines. The clamp is then placed upon the chain and the clamping arm and shank are brought together into the position shown in full lines and the nut is drawn up until the extractor screw is in line with the chain pintle pin with the centering jaws resting upon the roller. Then a tool is placed in the apertured head of the extractor screw and the head is rotated to exert a pressure on the chain pintle pin tending to unseat it. If the pin is frozen in place, it may sometimes be necessary to hammer on the end of the screw as the screw is being rotated. The power is sufficient under ordinary circumstances to unseat and push the pintle pin out of the chain. In fact, the power is so great that in actual practice frequently the pintle pin is forced out without even bothering to remove the cotter pin, the cotter pin being sheared off as the pintle pin is forced out. It will be understood that the tightness of the fit is at the end of the inward movement of the pintle pin so that a comparatively slight longitudinal displacement of the pintle pin is sufficient to unseat it when it may be withdrawn by hand.

In the modified form shown in Figures 4 to 10 inclusive the device is placed over the chain by releasing the holding screw and swinging the upper yoke out so that the two tension links may be swung apart sufficiently to engage the chain, with the V-jaws engaging the chain roller. The links are loosely pivoted or socketed with respect to the cross head and they may be easily brought into parallelism and held by the holding screw in the position shown in full lines in Figure 4 with the jaws adjustably positioned with respect to the tension link 38 so as to properly center the device. The extractor screw is rotated by a tool inserted in the eye on the end thereof and the pintle pin is extracted. If a narrower chain is used, the extractor pin is screwed up as indicated in Figure 9, the tension links are brought more closely together and the centering jaws are raised and moved inwardly or outwardly as the case may be to engage the roller.

The tool may also be used to seat a pint. The pin is inserted almost to the end of its travel as it enters the link and roller assembly before any pressure is needed. Pressure is then applied to seat it just as indicated above to unseat it.

In a very real sense, it will be understood, of course, that the device of Figures 4 to 10 is the same as the device of Figures 1 to 3. The tension link 37 is the equivalent of the clamp body 9. The nut and cross head 30, 31 is the equivalent of the clamping arm 21. The tension link 38 is the equivalent of the tie rod 14. The hooks 42, 43 engage the links just as does the fixed arm 11. The effect is the same in every respect except that the lateral movement of the tension members with respect to the nut and the lateral and vertical movement of the centering jaws with respect to the tension link 38 make it possible to use the modified form of the device with a wide range of chain sizes.

In the modified form in Figures 11 to 13, there is merely added to the extractor a chain tightening clamp which serves to hold the ends of the chain together when the pin has been displaced. This clamp comprises a channel 60 having a smooth roller or pintle engaging surface 61. At one end is a pintle or roller engaging hook 62 fixed in position. At the other end is a sliding yoke 63, enclosing the channel member, and carrying a chain engaging hook 64. It has lugs 65, projecting inwardly into the channel, the yoke 63 being recessed at 75 to receive a threaded nut 76, between the lugs 65, for engagement with the screw 66 so that rotation of the screw by means of the nut 67 keyed thereon will move the hook 64 toward and from the hook 62. It will be noted that the hooks 62 and 64 are widely spaced so that two intermediate pintles are freely held in between the pintles engaged by the hooks so that two pintles at one time with one setting may be worked upon by the extractor.

In this modification, the extractor is substantially the same as that disclosed in Figure 1 with the exception that the U-shaped frame member has arms 68, 69 joined by the handle 70. The tension member 71 is pivoted on the arm 69 and the threaded portion 72 engages the slotted end of the arm 68. The distance between the rectangular portion of the member 71 and the chain is sufficient to permit the entrance of the channel 60 so that the roller or bushing as the case may be, is centered by means of the curved jaw 73, on the central handle portion 70. The device is used by first applying the clamp to the chain, tightening it to take up the slack and release the tension on the links, the pins from which are to be unseated. Then the extractor is brought into register with the desired pintle and the pintle is extracted. Then the extractor is released and brought into register with the pintle at the other end of the link and that is extracted. Then new links or new pins are placed in position to replace the links or pins as the case may be which have been removed and the pintles are seated.

Ordinarily there will be a roller on the bushing and so in the claims I have referred to centering by engaging the roller. It will be understood, of course, that if the roller is omitted, the centering is applied to the bushing itself and in that connection, the use of the word "roller" in the claims is intended to cover both contact with the roller itself or contact with a bushing or other sprocket engaging member.

I claim:

1. A pin extractor for roller chains and the like comprising a clamp adapted to removably encircle the chain, means associated with the clamp, located at one side of and intermediate the two ends of a pintle pin for positioning it in register with the pin, an extractor screw threaded in the clamp adapted to engage the end of the pintle pin, an abutment at the other end of the clamp adapted to engage a chain link whereby upon rotation of the extractor screw, the pintle pin is forced out of the links, the clamp comprising a body member generally parallel with the pintle pin, a fixed arm projecting laterally therefrom to overlie a link, a tie rod pivoted on the fixed arm, a clamping arm pivoted on the body member and a releasable connection between the ends of the tie rod and the clamping arm, a nut associated with the clamping arm, the extractor screw being threaded in the nut.

2. A pin extractor for roller chains and the like comprising a clamp adapted to removably encircle the chain, means associated with the clamp for positioning it in register with a pintle pin, an extractor screw threaded in the clamp adapted to engage the end of the pintle pin, an abutment at the other end of the clamp adapted to engage a chain link whereby upon rotation of the extractor screw, the pintle pin is forced out of the links, the clamp comprising a body member generally parallel with the pintle pin, a fixed arm projecting laterally therefrom to overlie a link, a tie rod pivoted on the fixed arm, a clamping arm pivoted on the body member and a releasable connection between the ends of the tie rod and the clamping arm, roller engaging jaws carried by the tie rod and adapted to engage the roller of a chain to center it in the tool.

3. A pin extractor for roller chains and the like comprising a clamp adapted to removably encircle the chain, means associated with the clamp for positioning it in register with a pintle pin, an extractor screw threaded in the clamp adapted to engage the end of the pintle pin, an abutment at the other end of the clamp adapted to engage a chain link whereby upon rotation of the extractor screw, the pintle pin is forced out of the chain, the clamp comprising a body member generally parallel with the pintle pin, a fixed arm projecting laterally therefrom to overlie a link, a tie rod pivoted on the fixed arm, a clamping arm pivoted on the body member and a releasable connection between the ends of the tie rod and the clamping arm, roller engaging jaws carried by the tie rod and adapted to engage the roller of a chain to center it in the tool, the roller engaging jaws being adjustable with respect to the tie rod.

4. A pin extractor for roller chains and the like comprising a clamp adapted to removably encircle the chain, means associated with the clamp for positioning it in register with a pintle pin, an extractor screw threaded in the clamp adapted to engage the end of the pintle pin, an abutment at the other end of the clamp adapted to engage a chain link whereby upon rotation of the extractor screw, the pintle pin is forced out of the chain, the clamp comprising a body member generally parallel with the pintle pin, a fixed arm projecting laterally therefrom to overlie a link, a tie rod pivoted on the fixed arm, a clamping arm pivoted on the body member and a releasable connection between the ends of the tie rod and the clamping arm, roller engaging jaws carried by the tie rod and adapted to engage the roller of a chain to center it in the tool, the roller engaging jaws being adjustable both transversely and laterally with respect to the pintle pin and the tie rod.

5. A pin extractor for roller chains and the like comprising a clamp adapted to removably encircle the chain, means associated with the clamp for positioning it in register with a pintle pin, an extractor screw threaded in the clamp adapted to engage the end of the pintle pin, an abutment at the other end of the clamp adapted to engage a chain link whereby upon rotation of the extractor screw, the pintle pin is forced out of the chain, the clamp comprising a body member generally parallel with the pintle pin, a fixed arm projecting laterally therefrom to overlie a link, a tie rod pivoted on the fixed arm, a clamping arm pivoted on the body member and a releasable connection between the ends of the tie rod and the clamping arm, both ends of the tie rod being movable laterally toward and from the clamp body to compensate for different sizes of chain.

6. A pin extractor for roller chains and the like comprising a clamp adapted to removably encircle the chain, means associated with the clamp for positioning it in register with a pintle pin, an extractor screw threaded in the clamp adapted to engage the end of the pintle pin, an abutment at the other end of the clamp adapted to engage a chain link whereby upon rotation of the extractor screw, the pintle pin is forced out of the chain, the clamp comprising a central nut having arms projecting laterally therefrom, tension members one engaging each arm, the arm being longitudinally slotted, tie pins in the tension members holding the arms in loose engagement with the sockets, hooks on the upper inner ends of the tension members adapted to engage a chain link, a screw threaded in the nut adapted to engage the end of a chain pintle to exert a pressure thereon resisted by the engagement of the tension members and the link, a yoke pivoted on one tension member encircling the other at its end, a releasable means for holding the yoke in working relation with the two tension members.

7. A pin extractor for roller chains and the like comprising a clamp adapted to removably encircle the chain, means associated with the clamp for positioning it in register with a pintle pin, an extractor screw threaded in the clamp adapted to engage the end of the pintle pin, an abutment at the other end of the clamp adapted to engage a chain link whereby upon rotation of the extractor screw, the pintle pin is forced out of the chain, the clamp comprising a central nut having arms projecting laterally therefrom, tension members one engaging each arm, the arm being longitudinally slotted, tie pins in the tension members holding the arms in loose engagement with the sockets, hooks on the upper inner ends of the tension members adapted to engage a chain link, a screw threaded in the nut adapted to engage the end of a chain pintle to exert a pressure thereon resisted by the engagement of the tension members and the link, a yoke pivoted on one tension member encircling the other at its end, a releasable means for holding the yoke in working relation with the two tension members, a centering jaw adjustably mounted on one of the tension members for movement longitudinally and transversely thereof.

8. A pin extractor for roller chains and the like comprising a clamp member adapted to enclose the chain and to engage a link on one side thereof adjacent a selected pintle pin, a nut carried by the clamp member and movable toward and from the point of engagement of clamp and link in a direction generally parallel with the axis of the pin, a screw, threaded in the nut and adapted to engage the end of the pin, means for preventing movement of the nut away from, while permitting movement toward, the pin, and means adapted to engage the side of the chain for positioning the clamp member with respect thereto.

FRANK O. BLAKE.